(12) United States Patent
Kuksenkov et al.

(10) Patent No.: US 10,477,320 B2
(45) Date of Patent: Nov. 12, 2019

(54) THIN PANEL LOUDSPEAKERS (71) Applicant: CORNING INCORPORATED, Corning, NY (US)

(72) Inventors: Dmitri Vladislavovich Kuksenkov, Elmira, NY (US); David Ralph Maack, Horseheads, NY (US); Zhiqiang Shi, Shrewsbury, MA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/511,931

(22) PCT Filed: Sep. 16, 2015

(86) PCT No.: PCT/US2015/050325
§ 371 (c)(1),
(2) Date: Mar. 16, 2017

(87) PCT Pub. No.: WO2016/044361
PCT Pub. Date: Mar. 24, 2016

(65) Prior Publication Data
US 2017/0295432 A1    Oct. 12, 2017

Related U.S. Application Data

(60) Provisional application No. 62/052,778, filed on Sep. 19, 2014.

(51) Int. Cl.
*H04R 25/00* (2006.01)
*H04R 7/04* (2006.01)
*H04R 7/26* (2006.01)

(52) U.S. Cl.
CPC .............. *H04R 7/045* (2013.01); *H04R 7/26* (2013.01); *B32B 2307/102* (2013.01); *H04R 2440/01* (2013.01); *H04R 2440/05* (2013.01)

(58) Field of Classification Search
CPC .................................. H04R 7/045; H04R 7/26
(Continued)

(56) References Cited

U.S. PATENT DOCUMENTS 3,247,925 A * 4/1966 Warnaka ................. H04R 7/10
                                                              381/398
3,347,335 A * 10/1967 Watters .................. G10K 11/20
                                                              381/182

(Continued)

FOREIGN PATENT DOCUMENTS

DE       2112516 B     10/1972
DE   102007003165 A1    7/2008
(Continued)

OTHER PUBLICATIONS

Patent Cooperation Treaty International Notification of Transmittal of the International Search Report and The Written Opinion of the International Searching Authority, international application No. PCT/US2015/050325: dated Oct. 26, 2015, 12 pages.

(Continued)

*Primary Examiner* — Phylesha Dabney (57) ABSTRACT

Disclosed herein are speaker assemblies and acoustic devices comprising a panel having a long side and a short side, at least one transducer configured to excite the panel at a plurality of excitation locations on the panel to generate a wave having a wave front substantially perpendicular to the long side and propagating toward the short side of the panel and, optionally, at least one attenuating component mounted to the panel. Methods for generating an acoustic sound are also disclosed herein.

20 Claims, 7 Drawing Sheets

(58) Field of Classification Search
USPC .................. 381/152, 354, 431; 181/166
See application file for complete search history.

(56) References Cited

U.S. PATENT DOCUMENTS

| | | | | |
|---|---|---|---|---|
| 3,848,090 A * | 11/1974 | Walker | ............ | H04R 1/2834 381/152 |
| 4,198,550 A * | 4/1980 | Matsuda | ............ | H04R 7/06 181/167 |
| 4,385,210 A * | 5/1983 | Marquiss | ............ | H04R 11/02 181/150 |
| 4,392,027 A * | 7/1983 | Bock | ............ | H04R 7/02 381/152 |
| 4,483,700 A | 11/1984 | Forker | | |
| 5,674,790 A | 10/1997 | Araujo | | |
| 6,003,766 A * | 12/1999 | Azima | ............ | B42D 15/022 235/379 |
| 6,031,926 A * | 2/2000 | Azima | ............ | G06F 1/1616 381/398 |
| 6,058,196 A * | 5/2000 | Heron | ............ | G10K 13/00 181/148 |
| 6,144,746 A * | 11/2000 | Azima | ............ | G06F 1/1616 381/152 |
| 6,169,809 B1 * | 1/2001 | Azima | ............ | G06F 1/1616 381/152 |
| 6,215,881 B1 * | 4/2001 | Azima | ............ | B42D 15/022 181/167 |
| 6,215,882 B1 * | 4/2001 | Heron | ............ | H04R 1/025 181/148 |
| 6,282,298 B1 * | 8/2001 | Azima | ............ | G07F 9/02 381/423 |
| 6,285,770 B1 * | 9/2001 | Azima | ............ | B42D 15/022 381/152 |
| 6,307,942 B1 * | 10/2001 | Azima | ............ | B42D 15/022 381/152 |
| 6,320,967 B1 * | 11/2001 | Azima | ............ | B42D 15/022 381/152 |
| 6,332,029 B1 * | 12/2001 | Azima | ............ | B42D 15/022 181/166 |
| 6,377,695 B1 * | 4/2002 | Azima | ............ | B60R 11/0217 381/152 |
| 6,427,016 B1 * | 7/2002 | Azima | ............ | H04R 7/045 181/171 |
| 6,694,038 B1 * | 2/2004 | Azima | ............ | H04R 7/045 381/152 |
| 6,826,285 B2 | 11/2004 | Azima | | |
| 7,666,511 B2 | 2/2010 | Ellison et al. | | |
| 9,877,112 B2 * | 1/2018 | Srivastava | ............ | H04R 17/00 |
| 2001/0019616 A1 * | 9/2001 | Azima | ............ | H04R 7/045 381/152 |
| 2001/0026626 A1 | 10/2001 | Athanas | | |
| 2001/0039200 A1 * | 11/2001 | Azima | ............ | H04M 1/04 455/575.1 |
| 2002/0025049 A1 * | 2/2002 | Azima | ............ | B60J 3/0204 381/86 |
| 2002/0044668 A1 | 4/2002 | Azima | | |
| 2003/0007653 A1 * | 1/2003 | Azima | ............ | H04R 1/24 381/152 |
| 2003/0035560 A1 * | 2/2003 | Harris | ............ | H04R 7/045 381/152 |
| 2005/0018865 A1 * | 1/2005 | Azima | ............ | H04R 7/045 381/190 |

FOREIGN PATENT DOCUMENTS

| | | |
|---|---|---|
| WO | WO0078090 | 12/2000 |
| WO | 2016003962 A1 | 1/2016 |

OTHER PUBLICATIONS http://www.goebel-highend.de/en/company/technology.html, downloaded Mar. 14, 2017.
http://www.manger-audio.co.uk/manger-speakers-transducer.htm, downloaded Mar. 14, 2017.
European Patent Application No. 15770773.8 Office Action dated Feb. 5, 2019; 8 Pages; European Patent Office.

* cited by examiner

Time (us)

FIG. 5A

Time (us)

THIN PANEL LOUDSPEAKERS

This application is a national stage entry of International Patent Application Serial No. PCT/US15/50325 filed on Sep. 16, 2015, which claims the benefit of priority under to U.S. Application No. 62/052,778 filed on Sep. 19, 2014 the content of which is incorporated herein by reference in its entirety.

FIELD OF THE DISCLOSURE

Disclosed herein are thin panel speakers and acoustic devices and, more particularly, glass panel loudspeakers generating a bending wave having a substantially linear wave front.

BACKGROUND

Thin panel speakers can be used to emit sound due to propagation of bending waves in the panel by one or more transducers. Such distributed mode loudspeakers (DMLs) may have various advantages over conventional speakers, such as the ability to create a high sound pressure level (SPL) with a relatively small local displacement of the panel due to increased panel surface area. The transducers, or exciters, used to generate the bending waves can thus be small, and the entire speaker device can be thin, such that the panel speaker can be used in various emerging technologies, for example, speaking picture frames.

Similar to other panel type loudspeakers, such as electrostatic or planar magnetic speakers, DMLs can create a deep soundstage and a large "sweet spot" (e.g., area in the listening room with the best sound). However, the performance of DMLs in terms of sound quality can suffer from a number of shortcomings, such as non-flat frequency, randomized phase response, fast changes in frequency response with direction (listening position), and/or long sound decay times. These shortcomings may originate from one or more fundamental design features. For example, because it takes a finite amount of time for a bending wave in the panel to propagate from the excitation point (exciter/transducer attachment location) to the edge of the panel, sharp transients in the sound waveform can stretch in time. This stretch can also be frequency-dependent, since bending waves can be highly dispersive due to quickly travelling higher frequencies. Moreover, reflections from the edges of the panel can lead to the formation of distinct resonances in the frequency response, which can correspond to the mechanical modes of the panel. Finally, if the damping or wave attenuation in the panel material is not sufficiently high, the edge reflections can also cause "ringing" (the persistence of standing waves and the sound they emit after the excitation has stopped).

DMLs using only travelling bending waves have been developed in an attempt to remedy various drawbacks discussed above. For example, by introducing incisions precisely cut at the edges of a rectangular panel, or by using star-shaped diffusers at the outer edge of a circular panel, edge reflections may be passively suppressed. These designs can provide a flatter frequency and/or smoother phase response and/or can limit the distortion of sharp transients, such as ringing and/or modal resonances. However, these approaches can be difficult to implement in the case of a thin glass panel and/or a rectangular panel (e.g., a bar having short and long sides). Cutting precise slots in glass can be complex, time-consuming, and can compromise reliability of the panel. Moreover, in the case of a small rectangular panel, there may not be enough space along the short side for properly designed star-shaped or saw-tooth shaped diffusers. Further, incisions and/or star-shaped diffusers can diminish the aesthetic appearance of a glass panel, e.g., a transparent glass panel.

Accordingly, it would be advantageous to provide an exemplary glass loudspeaker which does not suffer from the disadvantages associated with conventional DMLs. It would also be advantageous to provide glass speakers which can utilize the advantage of non-resonant design while still preserving aesthetic display qualities.

SUMMARY

The disclosure relates, in various embodiments, to speaker assemblies comprising a panel having a long side and a first short side, at least one first transducer configured to excite the panel at a first plurality of excitation locations on the panel to generate a first wave having a wave front that is substantially perpendicular to the long side and propagating toward the first short side, and at least one attenuating component mounted to the panel and configured to attenuate wave energy.

Also disclosed herein are acoustic devices comprising a panel having a short side and a long side, and at least one transducer coupled to the panel and configured to excite the panel at a plurality of excitation locations arranged substantially in a line on the panel to generate a wave having a substantially linear wave front propagating toward the short side.

Further disclosed herein are methods of generating an acoustic sound, the methods comprising exciting a panel at a plurality of locations using one or more transducers to generate a wave having a wave front substantially perpendicular to a long side of the panel and propagating toward a short side of the panel; and optionally attenuating wave energy using at least one attenuating component mounted to the short side of the panel.

According to various embodiments, the panel may be a glass panel and can be chosen from a single sheet of glass, multiple sheets of glass in a single stack, glass-glass laminate structures, and glass-polymer laminate structures. The panel can also comprise other materials such as metals, plastics, wood, paper, and engineered materials such as layered materials like plywood and laminated glass-plastic composites, as well as engineered honeycomb panels. In other embodiments, the at least one transducer can be a single, line-shaped transducer mounted to the panel or a plurality of transducers mounted to the panel at the plurality of excitation locations.

The first plurality of excitation locations can, in certain embodiments, be arranged substantially in a first line. In additional embodiments, the panel can comprise a second short side and the plurality of excitation locations can be arranged substantially in a line adjacent the second short side. According to further aspects, the plurality of excitation locations can be arranged in a line that is substantially parallel to the second short side and located between the first and second short sides. In yet further embodiments, the speaker assembly can comprise a first plurality of excitation locations arranged substantially in a line adjacent the second short side and a second plurality of excitation locations arranged substantially in a line adjacent the first short side. In additional non-limiting embodiments, the attenuating component can be located adjacent the first or second short sides or between the first and second short sides.

Additional features and advantages will be set forth in the detailed description which follows, and in part will be readily apparent to those skilled in the art from that description or recognized by practicing the methods described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding, and are incorporated into and constitute a part of this specification. The drawings illustrate various non-limiting embodiments and together with the description serve to explain the principles and operations of the disclosure.

BRIEF DESCRIPTION OF THE DRAWINGS

Various features, aspects and advantages of the present disclosure are better understood when the following detailed description is read with reference to the accompanying drawings wherein like structures are indicated with like reference numerals when possible, in which.

DETAILED DESCRIPTION

Disclosed herein are speaker assemblies comprising a panel having a long side and a first short side, at least one transducer configured to excite the panel at a plurality of excitation locations on the panel to generate a wave having a wave front that is substantially perpendicular to the long side and propagating toward the first short side, and at least one component mounted to the panel and configured to attenuate wave energy.

Also disclosed herein are acoustic devices comprising a panel having a short side and a long side, and at least one transducer coupled to the panel and configured to excite the panel at a plurality of excitation locations arranged substantially in a line on the panel to generate a wave having a substantially line-shaped wave front propagating toward the first short side.

Further disclosed herein are methods of generating an acoustic sound, the methods comprising exciting a panel at a plurality of locations using one or more transducers to generate a wave having a wave front substantially perpendicular to a long side of the panel and propagating toward a short side of the panel; and optionally attenuating wave energy using at least one attenuating component mounted to the short side of the panel.

It is to be understood that the detailed description that follows and the various embodiments described herein can be equally applied to the speaker assemblies, acoustic devices, and methods disclosed and claimed herein, in combination and without limitation.

FIGS. 1A-B and 2A-B illustrate top views of non-limiting speaker assemblies according to various aspects of the disclosure. The speaker can comprise a panel 100 having two short sides 105, 110, and two long sides 115, 120. The short sides and long sides are interchangeably referred to herein as first and second short sides and first and second long sides, respectively, and their orientation should be understood to be non-limiting unless expressly stated otherwise. Further, while the two short sides 105, 110 and two long sides 115, 120 have been illustrated as substantially planar in form this should not limit the scope of the claims appended herewith as it is envisioned that any one or several of the long and/or short sides can be non-planar.

For example, in an alternative embodiment, each of the short sides can be planar as shown in the figures, however, the long sides 115, 120 can be non-planar, e.g, curved, and the opposing portion of the frame 135 can also be non-planar or curved, or vice versa. In non-limiting embodiments, the panel surface may be concave or convex, e.g., in the case of a panel shaped to conform to a curved TV screen or a speaker with a non-planar surface. An exemplary panel having a concave surface can thus contain one long side 115 (FIGS. 1A-B) or two long sides 115, 120 (FIGS. 2A-2B) and a convex opposing surface on the opposing portion of the frame 135. Of course, the opposing portion can also be concave with corresponding concave long side(s) to provide a hyperboloid cross section of an exemplary embodiment. It also follows that the panel surface can be convex with an opposing convex or concave opposing frame portion. As such, distribution of sound waves from an exemplary surface can also be appropriately controlled.

A plurality of excitation locations 125 can be arranged substantially in a line on the panel 100, and at least one transducer (not shown) can be configured to excite the panel at the plurality of excitation locations 125. For instance, the excitation locations can correspond to one or more transducers mounted, attached, or otherwise coupled to the panel 100 at the plurality of excitation locations or, in other embodiments, a single line transducer may be used to excite the panel at the plurality of excitation locations 125. The speaker can, in various embodiments, further comprise an attenuating component 130, configured to attenuate, e.g., absorb, diffuse, or moderate, wave energy, and optionally a frame 135 extending around at least a portion of the panel 100.

Figure 1A:
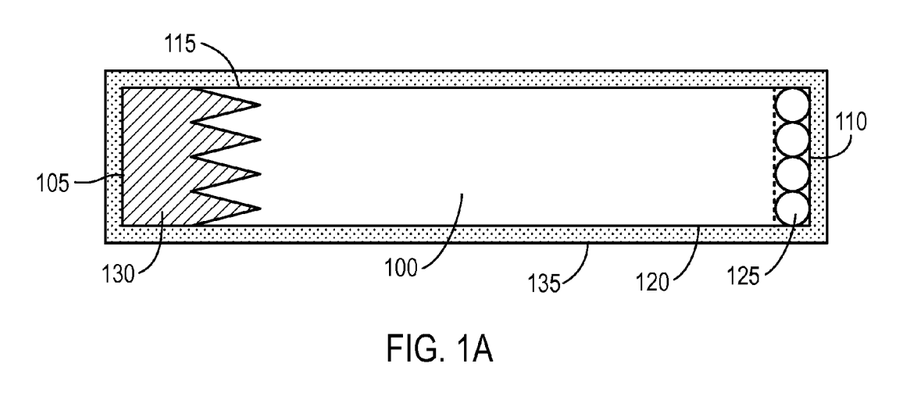
FIG. 1A is a top view of an exemplary speaker assembly according to aspects of the disclosure.
Figure 1B:
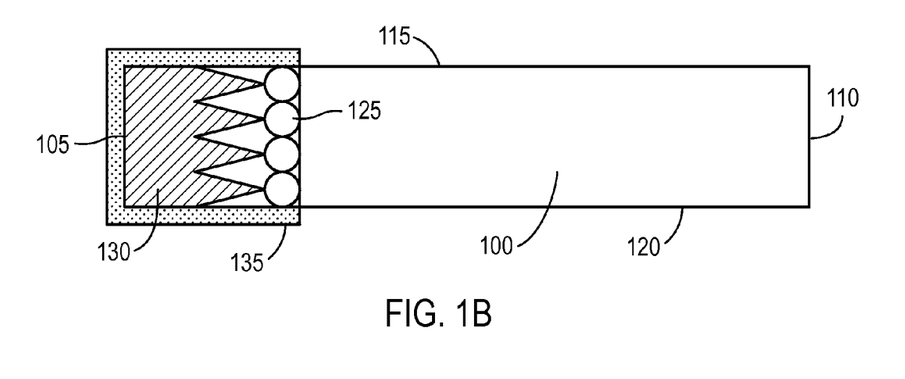
FIG. 1B is a top view of an exemplary speaker assembly according to additional aspects of the disclosure.
Figure 2A:
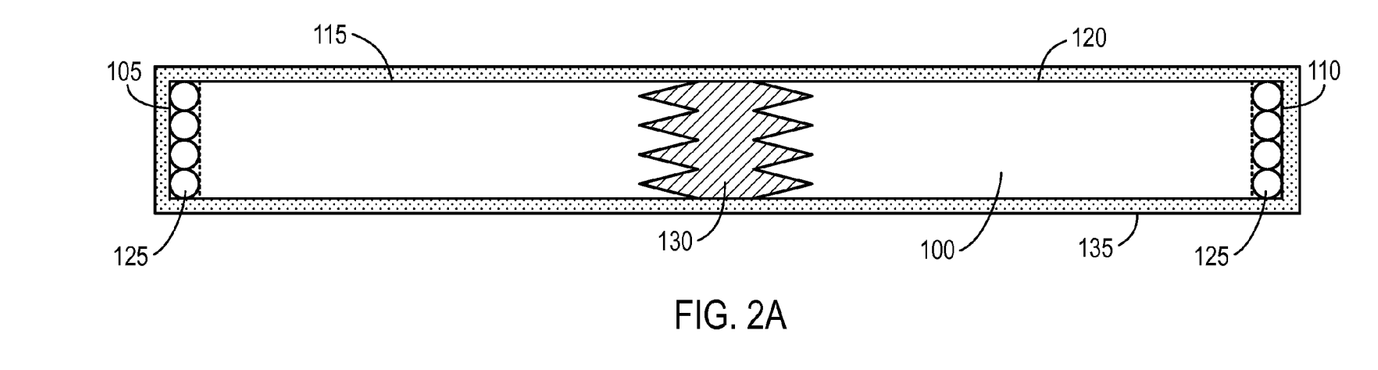
FIG. 2A is a top view of an exemplary speaker assembly in accordance with various aspects of the disclosure.
Figure 2B:
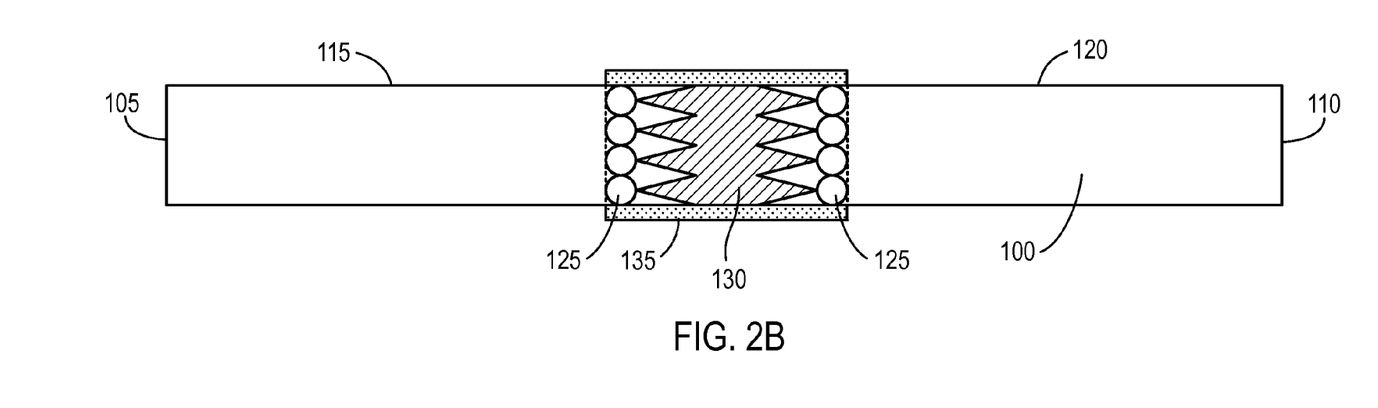
FIG. 2B is a top view of an exemplary speaker assembly in accordance with further aspects of the disclosure.

It is to be understood that, while FIGS. 1A-B illustrate a horizontal speaker orientation, the speakers could be used in any other orientation, such as a vertical orientation. Moreover, as shown in FIGS. 2A-B, speaker assemblies according to aspects of the disclosure can comprise two or more speaker configurations, e.g., to produce a stereo system. For instance, the speaker design illustrated in FIG. 2A can, in certain embodiments, exhibit a slightly better stereo separation than the design of FIG. 2B, whereas the design of FIG. 2B can represent a more modern aesthetic design. While not shown, the speaker assemblies can also comprise a third center channel speaker between the two speaker configurations, the third speaker also comprising a panel or otherwise using conventional cone drivers.

The arrangement of the excitation locations substantially in a line, whether excited by a single, line-shaped transducer, or by an array of transducers arranged substantially in a line, can generate a wave on the panel that has a substantially linear or line-shaped wave front. The linear wave front can propagate towards one or more of the short sides of the speaker panel with minimal reflection at the long sides of the panel. In certain non-limiting embodiments, the wave can be envisioned as having a "cylindrical" shape, in which a large majority of the wave energy propagates towards the short sides of the panel substantially in a line, with only a small portion reflecting at the long sides of the panel. Accordingly, in some aspects of the disclosure, it may not be necessary to suppress reflections at the long sides of the panel, e.g., using one or more absorbers or diffusers. In these non-limiting embodiments, a single attenuating component can be incorporated in, e.g., mounted to, the panel and configured to absorb or diffuse wave energy propagated only in the direction of the short sides of the panel, as shown in FIGS. 1A-B, and FIGS. 2A-B, discussed in more detail below.

In comparison, prior art speakers comprising a single-point exciter can generate a circular wave toward all sides of the panel, thus necessitating suppression of reflections at all sides of the panel to minimize modal behavior. Such prior art designs can be configured to utilize only traveling bending waves, as opposed to standing bending waves. To prevent formation of standing bending waves and modal resonances, these prior art devices can be configured to reduce or eliminate bending wave reflections at all four edges of the panel. Thus, whatever material is used to support the edges of the panel should not only match the mechanical impedance of the panel, but also either diffuse or absorb bending wave energy. However, in most cases the dimensions of the support can be significantly smaller than the wavelength of the bending wave to be absorbed.

For instance, the bending wave wavelength as a function of frequency is provided in Table I below for a non-limiting exemplary panel speaker employing 0.55 mm thick Corning® Gorilla® glass.

TABLE I

Bending Wave Wavelength as a Function of Frequency
(0.55 mm Corning ® Gorilla ® glass)

| Frequency | Wavelength (cm) |
|---|---|
| 50 Hz | 33.3 |
| 100 Hz | 23.5 |
| 150 Hz | 19.2 |
| 550 Hz | 10 |
| 1 kHz | 7.4 |
| 2.2 kHz | 5 |
| 6.15 kHz | 3 |
| 13.9 kHz | 2 |

Assuming that a length of ¼ wave is desirable for the absorber or diffuser, and that it is desirable to suppress reflections at least down to 150 Hz frequency, a minimum length for the attenuating component can be calculated as at least about 5 cm. Thus, prior art speakers configured to eliminate bending wave reflections at all four edges of the panel can be limited in size, e.g., cannot perform adequately at smaller sizes. In particular, in the case of a rectangular-shaped panel, e.g., a speaker bar, the short side of the bar would likely have a length greater than 10 cm to produce any sound at all, with the possibility that a length twice that (e.g., about 20 cm) could be necessary to produce sound efficiently.

The speakers and acoustic devices disclosed herein can comprise a thin panel, for instance, a panel having a thickness ranging from about 0.1 mm to about 3 mm, such as from about 0.3 mm to about 2.5 mm, from about 0.3 mm to about 2 mm, from about 0.5 mm to about 1.5 mm, or from about 0.7 mm to about 1.1 mm, including all ranges and subranges therebetween. The panel may, in some embodiments, have a substantially rectangular (e.g., bar) shape. In such embodiments, the panel can comprise two short sides and two long sides. However, it is to be understood that the panel is not limited to rectangular shapes and may have any other suitable shape. For instance, according to various aspects of the disclosure, the two long sides may be substantially equal in length or they may have different lengths. Likewise, the two short sides may be substantially equal in length or may have different lengths. The long side(s) of the panel may have a dimension ranging, in various non-limiting embodiments, from about 20 cm to about 200 cm, such as from about 30 cm to about 150 cm, or from about 50 cm to about 100 cm, including all ranges and subranges therebetween. The short side(s) of the panel may have a dimension ranging, for example, from about 5 cm to about 25 cm such as from about 8 cm to about 20 cm, or from about 10 cm to about 15 cm, including all ranges and subranges therebetween.

The panel can comprise any suitable material, including glass, metal, plastic, wood, paper, and engineered materials such as layered materials, e.g., plywood and glass-plastic composites, and engineered honeycomb panels. According to certain embodiments, the panel may comprise glass, such as soda-lime silicate, aluminosilicate, alkali-aluminosilicate, borosilicate, alkali-borosilicate, aluminoborosilicate, alkali-aluminoborosilicate, and other suitable glasses. The panel can, in various embodiments, comprise transparent, opaque, or colored glass. Non-limiting exemplary glass panels include, but are not limited to, a single sheet of glass, multiple sheets of glass in a single stack, glass-glass laminate structures, and glass-polymer laminate structures. The glass may, in various embodiments, be chemically strengthened. Non-limiting examples of suitable commercially available substrates include EAGLE XG®, Lotus™, Willow®, and Gorilla® glasses from Corning Incorporated, to name a few. Such chemically strengthened glass, for example, may be provided in accordance with U.S. Pat. Nos. 7,666,511, 4,483,700, and 5,674,790, which are incorporated herein by reference in their entireties.

Chemical strengthening of glass can be carried out, e.g., by ion exchange. During the ion exchange process, ions within a glass sheet at or near the surface of the glass sheet may be exchanged for larger metal ions, for example, from a salt bath. The incorporation of the larger ions into the glass can strengthen the sheet by creating a compressive stress in a near surface region. A corresponding tensile stress can be induced within a central region of the glass sheet to balance the compressive stress.

Ion exchange may be carried out, for example, by immersing the glass in a molten salt bath for a predetermined period of time. Exemplary salt baths include, but are not limited to, $KNO_3$, $LiNO_3$, $NaNO_3$, $RbNO_3$, and combinations thereof. The temperature of the molten salt bath and treatment time period can vary. It is within the ability of one skilled in the art to determine the time and temperature according to the desired application. By way of a non-limiting example, the temperature of the molten salt bath may range from about 400° C. to about 800° C., such as from about 400° C. to about 500° C., and the predetermined time period may range from about 4 to about 24 hours, such as from about 4 hours to about 10 hours, although other temperature and time combinations are envisioned. By way of a non-limiting example, the glass can be submerged in a $KNO_3$ bath, for example, at about 450° C. for about 6 hours to obtain a K-enriched layer which imparts a surface compressive stress.

By way of non-limiting example, the chemical strengthening process of Corning® Gorilla® glass can provide a relatively high compressive stress (e.g., greater than about 500 MPa, such as from about 700 MPa to about 730 MPa; and even capable of greater than 800 MPa) with a relatively deep depth of layer which is in compression (e.g., about 40 to 50 microns; and even capable of greater than 100 microns). Such glass can have a high retained strength and high resistance to scratch damage, high impact resistance, and/or high flexural strength as well as a substantially pristine surface. According to various embodiments, the glass panel may have a compressive stress greater than about 100 MPa and a depth of layer of compressive stress (DOL) greater than about 10 microns. In further embodiments, the glass may have a compressive stress greater than about 500 MPa and a DOL greater than about 20 microns, or a compressive stress greater than about 700 MPa and a DOL greater than about 40 microns.

The speaker or acoustic device disclosed herein can also comprise at least one transducer configured to excite the panel at the plurality of excitation locations. The terms "transducer," "exciter," "actuator," and variations thereof are used interchangeably herein to refer to a component capable of applying bending wave energy to the panel in the form of dispersive travelling waves at one or more excitation locations in response to an applied electrical signal, causing the panel to vibrate and radiate an acoustic output. The at least one transducer can comprise a single, line-shaped transducer, or an array of transducers driven synchronously. The transducers can be, e.g., small electric motors, which can be directly attached, for example, glued, to the panel and/or to the frame ("grounded" design). Alternatively, the transducers can be otherwise attached to the panel, e.g., by small springs, which can be used to transfer vibration energy to the panel or frame through inertial force. Other suitable transducers can include, for instance, piezo-electric exciters which can be line-shaped or an array of such exciters arranged substantially in a line.

The at least one transducer can be coupled to the panel, e.g., mounted or otherwise attached to the panel or otherwise configured to apply bending wave energy to the panel even if not attached or mounted to the panel. In the case of a single, line-shaped transducer, the transducer can be mounted or otherwise attached to the panel in a location corresponding to the plurality of excitation locations arranged substantially in a line. The transducer can thus be configured to excite the panel at one or more of the plurality of excitation locations. In the case of two or more transducers, such as three or more transducers, four or more transducers, and so on, each transducer can correspond to and excite one of the plurality of excitation locations or, in additional embodiments, one transducer can excite the panel at more than one excitation location. Other transducer configurations are envisioned and intended to fall within the scope of the instant disclosure.

The speaker or acoustic device disclosed herein can further comprise at least one component mounted to the panel and configured to absorb or diffuse wave energy. The terms "absorber," "diffuser," "attenuator," "attenuating component" and variations thereof are used interchangeably herein to refer to a component configured to attenuate, e.g., diffuse or absorb, travelling bending waves in the panel to prevent, substantially prevent, or at least moderate panel resonance by absorbing and/or diffusing the wave energy.

Suitable absorbing or diffusing materials can include materials which can be used to support the panel and/or match the panel in terms of mechanical impedance while also absorbing acoustic wave energy at audible frequencies. However, materials meeting all of these criteria may be difficult to engineer or otherwise provide. Thus, it may be desirable to provide acoustically absorptive materials with a "gradient" in the mechanical impedance, e.g., slowly changing from that of the "free" panel to infinity (clamped edge/support). For instance, pressure can be applied to the attenuating component increasingly from the edge where it first touches the panel to the edge of the panel, e.g., by squeezing with a clamp. According to various embodiments, the attenuating component can comprise a material chosen from polymeric foams having open or closed structures, such as polyurethanes, polyethers, and polyesters; polyvinyl chloride; leathers; fabrics; papers; and liquid-based coatings, to name a few.

The attenuating component can provide mechanical impedance to the panel by way of increasing the stiffness of at least a portion of the panel and/or by providing structural mechanical impedance to at least a portion of the panel. The attenuating component can also absorb bending wave energy over at least a portion of the panel. The attenuating component can have a uniform or non-uniform mechanical impedance profile across at least a portion of the panel. The attenuation of bending wave energy can, in some embodiments, increase from a point where the component first contacts the panel to an edge of the panel, e.g., a short side of the panel. The attenuation of bending wave energy can therefore be reduced at a central portion of the panel as compared to one or more panel edges, or vice versa, depending on the location of the attenuating component.

In various non-limiting embodiments, the attenuating component 130 can comprise an attenuating material, such as foam rubber, and can be shaped to have at least one "saw-tooth" like or serrated edge (see, e.g., FIGS. 1A-B and 2A-B). This component can be glued or otherwise mounted to the panel, e.g., between the panel and the device frame. The serrated portion can provide a transition for the mechanical impedance of the panel, which can slowly change from that of free glass to that of glass and foam to that of the support or frame, thereby eliminating or reducing bending wave reflections. As shown in FIGS. 1A-B, an additional "straight" section of the foam at the edge of the panel can absorb any residual bending wave energy.

The shape and size of the "teeth" of the serrated edge can be calculated depending on the properties of the acoustic material used. A general guideline derived from optical analogues (e.g., "moth eye" anti-reflective coatings) indicates that the transverse dimensions of the individual "teeth" can be smaller than the shortest wavelength in the range of interest, and the length of the "teeth" can be at least a quarter of the longest wavelength in the range of interest. Referring to Table I, assuming a target elimination of reflections in the range of about 100 Hz to about 14 kHz, a suitable serrated edge could include teeth less than about 2 cm wide at the base and greater than about 6 cm in length. The size, shape, and orientation of the teeth can vary depending on the panel configuration, the acoustic absorbing material, and/or the desired frequency elimination range.

By way of a non-limiting example, the attenuating component can comprise teeth having a width at their base ranging from about 0.5 cm to about 5 cm, such as from about 1 cm to about 4 cm, from about 1.5 cm to about 3 cm, or from about 2 cm to about 2.5 cm, including all ranges and subranges therebetween. Further, the teeth may have a length ranging from about 1 cm to about 25 cm, such as from about 2 cm to about 20 cm, from about 3 cm to about 15 cm, from about 5 cm to about 10 cm, or from about 8 cm to about 12 cm, including all ranges and subranges therebetween.

The acoustically absorbent material can, in some embodiments, be used to mount the panel to a support or frame, and can be impedance-matched or gradient impedance-matched to the panel. In addition, the attenuating component can comprise one or more layers, which can have varying shapes and sizes and which can be attached to the panel. The attenuating component can, for instance, comprise one or more polymeric layers which can provide a variation in panel thickness and or density across at least a portion of the panel. According to various embodiments, one or more layers can be provided on one or both surfaces of the panel, for example, by lamination. Lamination can provide various benefits, e.g., improving the safety and/or acoustic performance of panel.

For instance, as illustrated in FIGS. 3A-D, layered lamination or constrained layer lamination can be used to absorb incident wave energy at the edge by introducing controlled local damping. As a bending wave reaches the laminated portion of the panel, part of the energy can transfer to the one or more layers due to the intimate bonding at the panel/layer (e.g., glass/polymer) interface, and dissipate into the layer due to its much higher material damping. Suitable lamination materials can include, for example, polyvinyl butyrate (PVB), acoustic PVB, ethylene vinyl acetate (EVA), thermoplastic polyurethane (TPU), and various ionomers, to name a few.

Figure 3A:
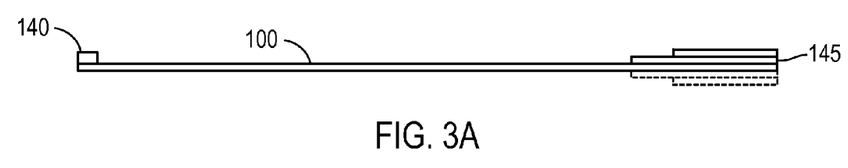
FIG. 3A is a side view of an exemplary speaker assembly according to aspects of the disclosure.
Figure 3B:
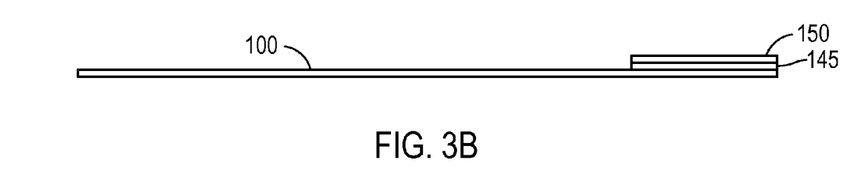
FIG. 3B is a side view of an exemplary speaker assembly according to additional aspects of the disclosure.
Figure 3C:
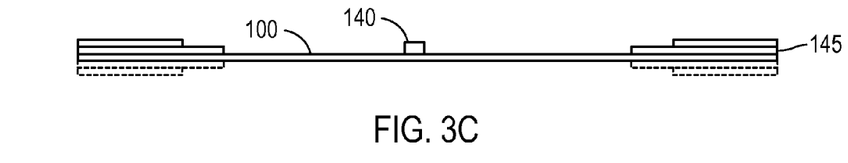
FIG. 3C is a side view of an exemplary speaker assembly in accordance with various aspects of the disclosure.
Figure 3D:
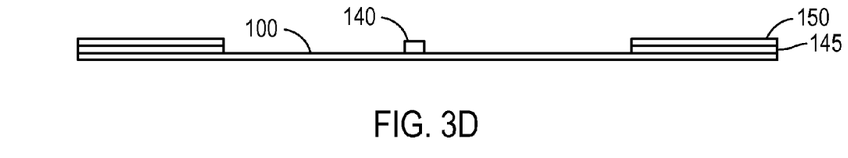
FIG. 3D is a side view of an exemplary speaker assembly in accordance with further aspects of the disclosure.

FIG. 3A illustrates a side view of a speaker panel laminated with at least one layer 145. In the illustrated embodiment, at least one transducer 140 can be mounted to the panel 100 and an attenuating component can be mounted to the panel 100 at an opposing end. For instance, the attenuating component can comprise one or more layers 145 which can be laminated to one or both surfaces of the panel 100. The laminated layers 145 can be chosen from the same materials, or can comprise any combination of laminate materials. Alternatively, as illustrated in FIG. 3B, one surface of the panel can be laminated with one or more layers 145, which can be constrained by an additional layer of material 150, e.g., panel material such as a glass sheet or other material. Similarly, as depicted in FIGS. 3C-D, at least one transducer 140 can be mounted to a central portion of the panel 100, with two attenuating components adjacent each opposing end. The attenuating components can likewise comprise one or more layers 145 laminated to one or both surfaces of the panel 100, or one or more layers 145 constrained by an additional layer of material 150.

The speaker assemblies or acoustic devices disclosed herein can further comprise a frame extending around at least a portion of the panel. The terms "frame," "support," and variations thereof are used interchangeably herein to refer to any material configured to provide support to the panel. In certain embodiments, the frame may comprise a material chosen from polymeric materials, plastics, wood, and metals, to name a few. The frame or support can extend around the entire perimeter of the panel (see, e.g., FIGS. 1A and 2A) or, in certain embodiments, can extend around only a portion of the panel. For instance, in some non-limiting embodiments, the frame can extend around a portion of the panel to which the attenuating component and/or exciters are mounted (see, e.g., FIGS. 1B and 2B).

According to various embodiments, the speaker or acoustic device can further include an enclosure behind the panel, which can have any shape and/or dimensions appropriate for the desired acoustic effect. One skilled in the art can engineer such an enclosure using known techniques in the loudspeaker art. The enclosure can, for example, include at least one conventional design woofer, which can address lower frequencies that the panel alone may not be able to reproduce in certain embodiments. For instance, by way of a non-limiting example, the speaker panel of FIG. 1B could be turned 90 degrees counterclockwise, with a speaker base or enclosure housing a woofer, the attenuating component and the at least one transducer, such that panel can extend upward from the base. In certain embodiments, the panel extending from the base can be clear glass devoid of a frame or any visible attenuating components, which can provide a sleek aesthetic design.

Other additional components can also be included in the speakers disclosed herein. For example, functional or decorative elements may be employed within or in conjunction with the speaker and acoustic device assemblies disclosed herein. For example, decorative lighting elements can be used to illuminate the speaker and/or display a message. These lighting effects can be decorative in nature or can serve as an indicator to the user, for instance, to notify a user that the speaker is on. In additional embodiments, the speaker can be configured with a sensor or active device, such as a touch pad and any associated electronics, which can, for example, be provided in the frame, base, or in an intermediate layer in the speaker panel. For instance, in the case of a thin glass sheet, the glass sheet can be provided directly adjacent a touch pad such that a user can interface with the touch pad and, for example, turn on the speaker or adjust the volume.

The speaker assemblies, as illustrated in FIGS. 1A-B, can comprise a single array of excitation locations on the panel 100. In FIG. 1A, the plurality of excitation locations 125 can be adjacent the (second) short side 110. The wave generated at the plurality of excitation locations can propagate in one direction toward the (first) short side 105, where it is absorbed by the attenuating component 130, which can be adjacent the (first) short side 105. In FIG. 1B, the plurality of excitation locations can be located between the two short sides 105, 110, e.g., adjacent the attenuating component 130. For instance, the attenuating component and/or the array of excitation locations can be centrally located on the panel. The wave generated at the plurality of excitation locations can propagate in two directions, toward both the (first) short side 105, and the (second) short side 110. The wave can, for example, travel to the (second) short side 110 and reflect back to the (first) short side 105, where it can be absorbed or diffused. In certain embodiments, the speaker illustrated in FIG. 1B can have higher efficiency, due to higher energy transfer to the air before the wave is absorbed or diffused, but may have a slightly longer transient response, due to the longer time for the bending wave and sound to decay after the excitation has stopped.

The speaker assemblies, as illustrated in FIGS. 2A-B, can comprise more than one array of excitation locations, such as two arrays, on the panel 100. In FIG. 2A, the two arrays of excitation locations can each be adjacent a short side 105, 110. The wave generated at the two arrays can be absorbed by the attenuating component 130, which can be located between the two short sides 105, 110. For example, in some non-limiting embodiments, the attenuating component 130 can be centrally located on the panel 100. In FIG. 2B, the two arrays of excitation locations can be located between the two short sides 105, 110, e.g., adjacent the attenuating component 130. By way of non-limiting example, the attenuating component and/or the arrays of excitation locations can be centrally located on the panel. The wave generated at the plurality of excitation locations can propagate toward and reflect at both short sides 105, 110 back toward the attenuating component 130.

It is to be understood that the disclosure provided herein with respect to speaker assemblies is equally applicable to the claimed acoustic devices, with the components being described interchangeably and without limitation. Speaker assemblies and acoustic devices of the present disclosure may have a number of advantages over conventional speakers, e.g., DMLs. For example, speakers and acoustic devices of the present disclosure may provide a flat frequency response and a linear phase response while also minimizing ringing, e.g., reducing the sound decay time. In addition, the speakers and acoustic devices of the present disclosure may provide enhanced aesthetic qualities and/or smaller speaker dimensions, e.g., due to the lack of attenuating components at all edges of the device and/or the use of transparent glass and/or transparent acoustic absorbing materials.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a transducer" includes examples having two or more such transducers unless the context clearly indicates otherwise. Likewise, a "plurality" or an "array" is intended to denote "more than one." As such, an "array of excitation locations" or a "plurality of excitation locations" includes two or more such excitation locations, such as three or more such excitation locations, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, "substantially equal" is intended to denote that two values are equal or approximately equal, and "substantially similar" is intended to denote, e.g., that one element is approximately the same shape as another element.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an assembly that comprises A+B+C include embodiments where an assembly consists of A+B+C and embodiments where an assembly consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

Figure 4A:
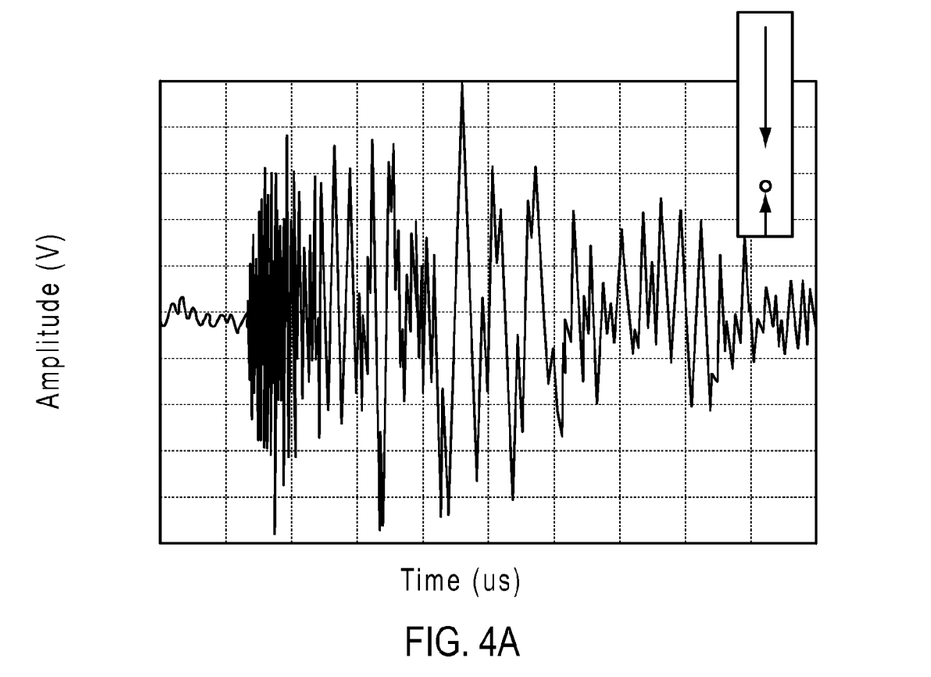
FIG. 4A is a graphical illustration of the vibration impulse response of an exemplary speaker not comprising an attenuating component.
Figure 4B:
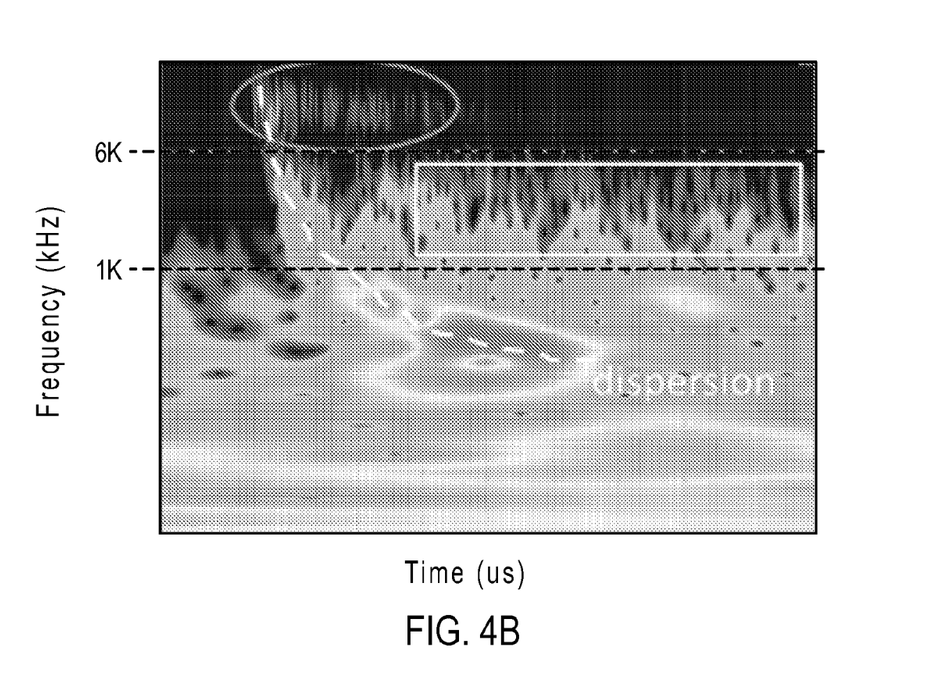
FIG. 4B is the corresponding wavelet map for the exemplary speaker of FIG. 4A.
Figure 5A:
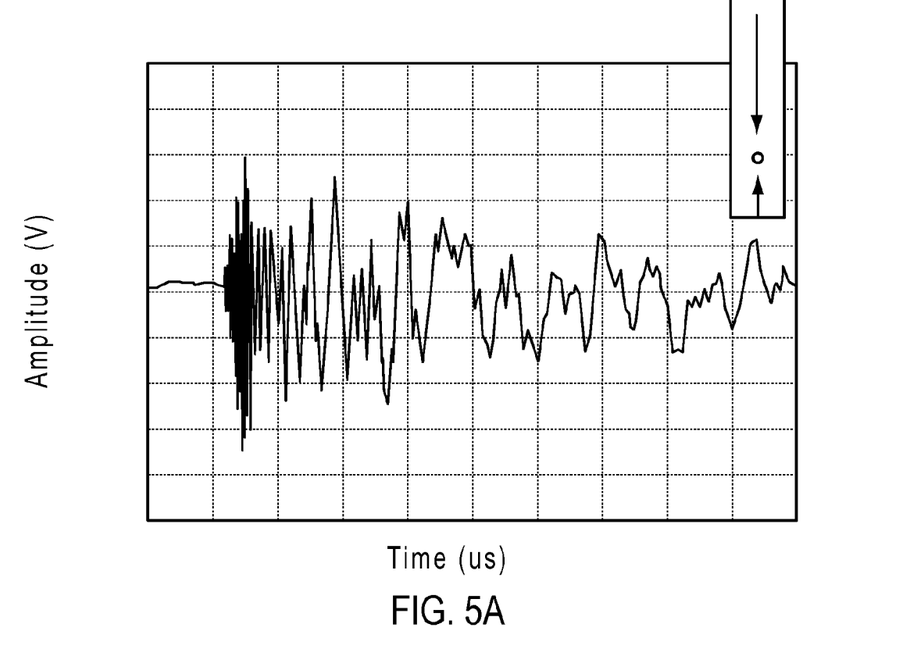
FIG. 5A is a graphical illustration of the vibration impulse response of a speaker assembly according to aspects of the disclosure.
Figure 5B:
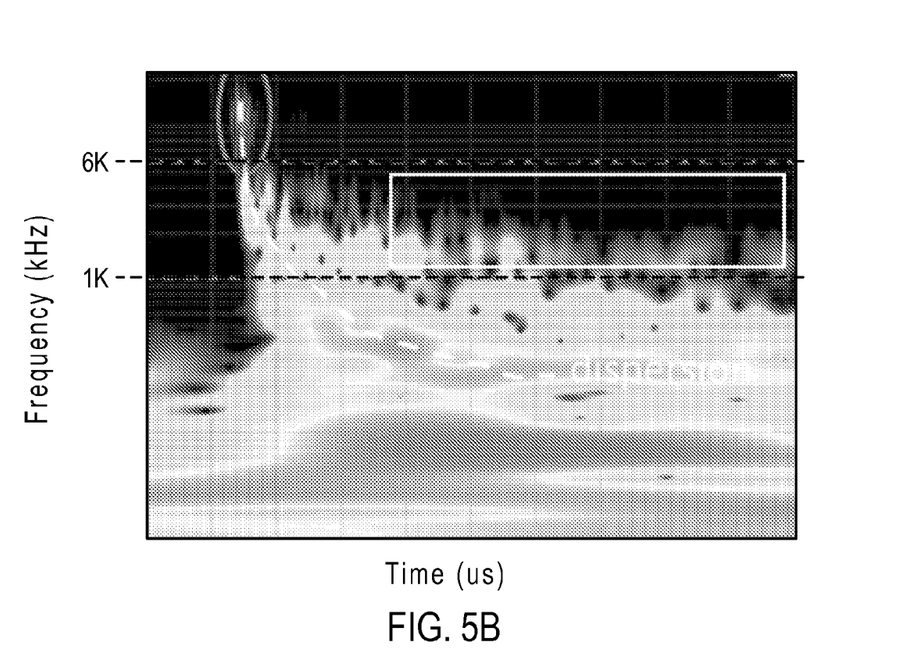
FIG. 5B is the corresponding wavelet map for the speaker assembly of FIG. 5A.

Sheets of glass (Corning® Gorilla® glass, 0.55 mm thick) were used to analyze the effect of lamination on bending wave reflections at the edges of a glass panel speaker. A rectangular-shaped glass bar was laminated on one short side with a strip of PVB having a length of about 6 inches. A comparative glass bar without lamination ("free edge") was also evaluated. The impulse response of each glass bar was recorded with a laser Doppler vibrometer at a point close to the edge (6" from the free edge; 7.5" from the laminated edge), as illustrated in FIGS. 4A and 5A. The corresponding wavelet maps (time-frequency representation of the impulse response) are illustrated in FIGS. 4B and 5B, respectively. With reference to FIGS. 4A-B and 5A-B, dispersion of the bending waves can be clearly seen in both wavelet maps as the bending wave travels from the opposing short side, but the glass speaker bar with the laminated edge absorbs high frequency reflection (>10 kHz) after the first arrival, as illustrated by the circled portions of the wavelet map, and attenuates a broad frequency band between 1~6 kHz, as illustrated by the boxed portion of the wavelet map.

Figure 6:
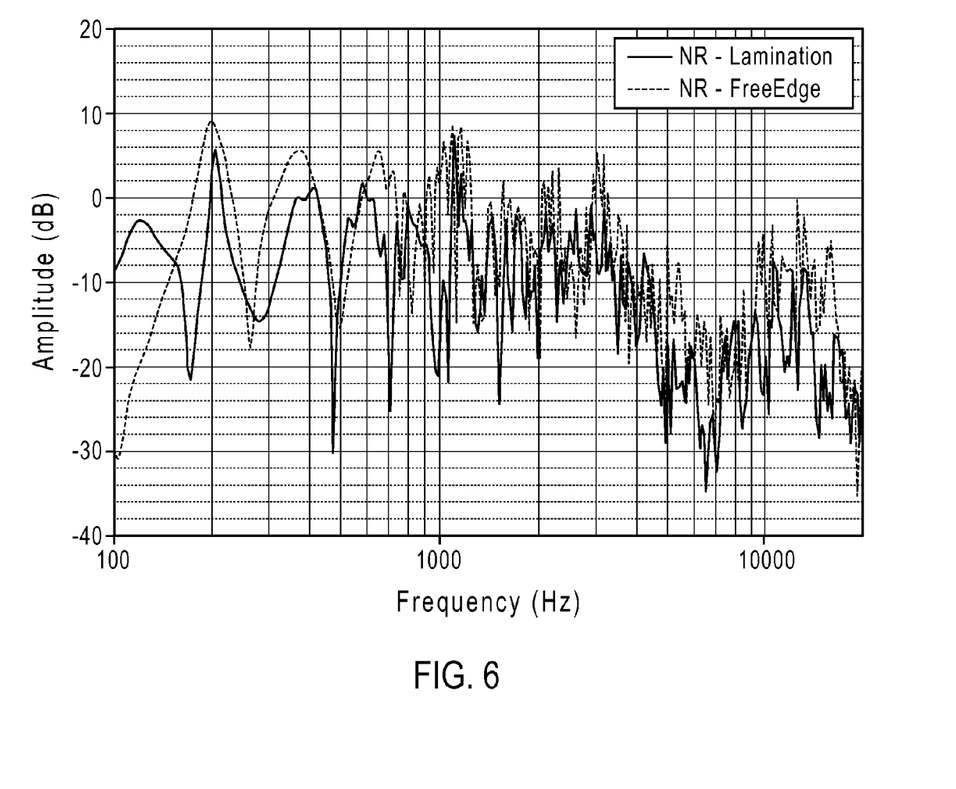
FIG. 6 is a graphical illustration comparing the frequency response of an exemplary speaker assembly according to aspects of the disclosure.
Figure 7:
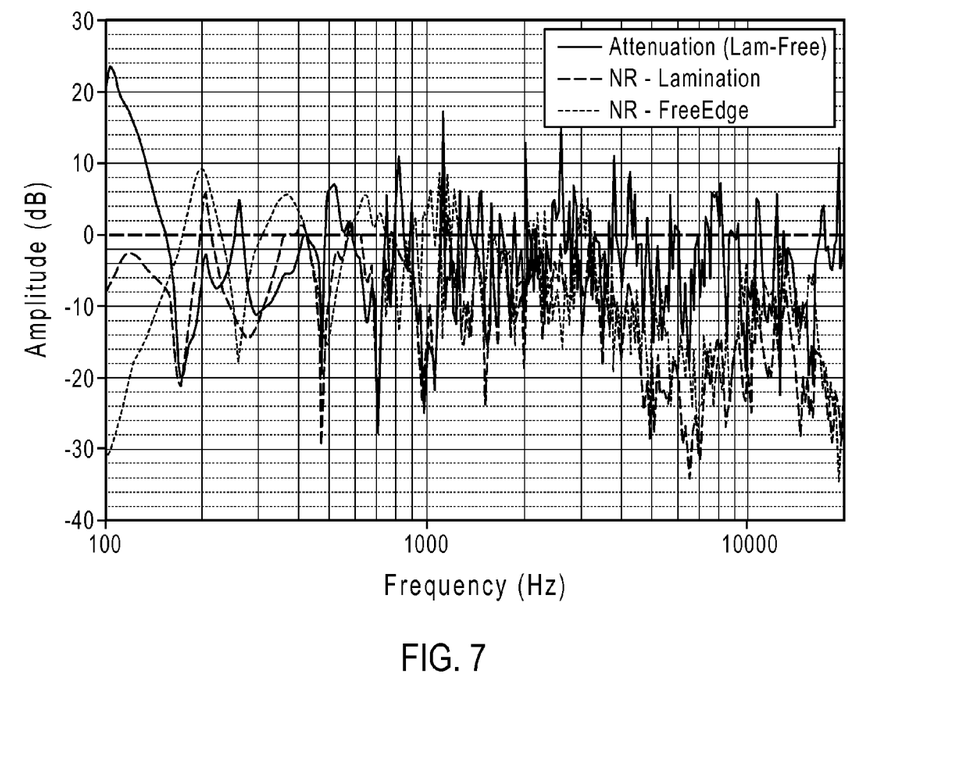
FIG. 7 is a graphical illustration comparing the normalized frequency response of an exemplary speaker assembly according to aspects of the disclosure.

The corresponding frequency response, as recorded and as normalized (relative to the frequency response of the drivers) is illustrated in FIGS. 6-7, respectively. With reference to FIGS. 6-7, frequency-dependent attenuation induced by the laminated edge can be clearly seen at higher frequencies. Damping at lower frequencies is less effective, which is likely due to the longer wavelength of these frequencies, as discussed above with respect to Table I. Without wishing to be bound by theory, it is believed that damping at lower frequencies could be improved by increasing the length of the laminated PVB strip, e.g., up to at least about a quarter of the longest wavelength in the range of interest. Additionally, the use of materials with higher acoustic absorbance, saw-tooth shaped absorbers, multi-layer lamination, and/or constrained layer lamination could also be used to improve edge absorption or reduce the length dimension of the absorbing material.

What is claimed is:

1. A speaker assembly comprising:
   a panel having a long side and opposing first and second short sides;
   at least one first transducer configured to excite the panel at first excitation locations on the panel to generate a first wave having a wave front substantially perpendicular to the long side and propagating toward the first short side; and
   a first layer of an acoustic absorbing material mounted on a first major surface of the panel and configured to attenuate wave energy by applying an increasing amount of mechanical impedance to the panel in a propagation direction of the wave,
   wherein the first layer of acoustic absorbing material comprises a first serrated edge disposed on the first major surface of the panel and facing the first excitation locations.

2. The speaker assembly of claim 1, wherein the at least one first transducer is a single, line-shaped transducer mounted to the panel.

3. The speaker assembly of claim 1, wherein the at least one first transducer comprises a plurality of transducers mounted to the panel at the first excitation locations.

4. The speaker assembly of claim 1, wherein the first excitation locations are arranged in a line substantially parallel to the first short side.

5. The speaker assembly of claim 1, wherein the first excitations locations are located adjacent the second short side.

6. The speaker assembly of claim 5, wherein the first layer is mounted to the panel adjacent the first short side.

7. The speaker assembly of claim 1, wherein:
   the first exciation locations are located between the first and second short sides,
   the first layer of attenuating component is mounted adjacent the second short side, and
   the first wave reflects from the first short side toward the second short side.

8. The speaker assembly of claim 1, further comprising at least one second transducer configured to excite the panel at second excitation locations to generate a second wave having a wave front substantially perpendicular to the long side and propagating toward the second short side.

9. The speaker assembly of claim 8, wherein:
   the first excitation locations are located adjacent the second short side, and
   the second excitation locations are located adjacent the first short side.

10. The speaker assembly of claim 9, wherein the first layer is located between the first excitation locations and the second excitation locations.

11. The speaker assembly of claim 8, wherein:
    the first layer is centrally located between the first and second short sides, and
    the first and second excitation locations are located on opposing sides of and adjacent to the first layer.

12. The speaker assembly of claim 8, wherein the first layer comprises a second serrated edge disposed on the first major surface of the panel and facing the second excitation locations.

13. The speaker assembly of claim 1, further comprising a frame configured to support at least a portion of the panel.

14. The speaker assembly of claim 1, wherein the panel is a glass panel chosen from a single glass sheet, multiple sheets of glass in a single stack, glass-glass-laminates, and glass-polymer laminate structures.

15. The speaker assembly of claim 1, wherein the panel comprises a material chosen from metals, plastics, wood, plywood, paper, glass-plastic composites, and engineered honeycomb panels.

16. The speaker assembly of claim 1, further comprising a second layer of an acoustic absorbing material mounted on a second surface of the panel, wherein the second layer faces the first layer.

17. The speaker assembly of claim 1, further comprising a second layer of the acoustic absorbing material mounted on the first layer.

18. The speaker assembly of claim 1, wherein the long side or first short side is non-planar.

19. The speaker assembly of claim 1, wherein the first serrated edge comprises a plurality of teeth laterally extending between the first short side and the second short side, each tooth comprising a width ranging from about 0.5 cm to about 5 cm and a length ranging from about 1 cm to about 25 cm.

20. A method of generating an acoustic sound, comprising:
    exciting a panel of at a plurality of excitation locations using one or more transducers to generate a wave having a wave front substantially perpendicular to a long side of the panel and propagating toward a short side of the panel; and
    attenuating wave energy by applying an increasing amount of mechanical impedance to the panel in a propagation direction of the wave, using a first layer of an acoustic absorbing material comprising a serrated edge disposed on a first major surface of the panel and facing the plurality of excitation locations.

* * * * *

UNITED STATES PATENT AND TRADEMARK OFFICE
CERTIFICATE OF CORRECTION

PATENT NO. : 10,477,320 B2
APPLICATION NO. : 15/511931
DATED : November 12, 2019
INVENTOR(S) : Dmitri Vladislavovich Kuksenkov et al.

Page 1 of 1

It is certified that error appears in the above-identified patent and that said Letters Patent is hereby corrected as shown below:

In the Claims

Column 13, Line 46, Claim 7, delete "exciation" and insert -- excitation --, therefor.

Column 13, Line 48, Claim 7, after "layer" delete "of attenuating component".

Signed and Sealed this
Fourth Day of February, 2020

Andrei Iancu
*Director of the United States Patent and Trademark Office*